United States Patent [19]

Martinie

[11] Patent Number: 4,763,904
[45] Date of Patent: Aug. 16, 1988

[54] SEALING APPARATUS

[75] Inventor: Howard W. Martinie, Simpsonville, S.C.

[73] Assignee: Reliance Electric Company, Greenville, S.C.

[21] Appl. No.: 915,503

[22] Filed: Oct. 6, 1986

[51] Int. Cl.⁴ .................. F16J 15/32; F16J 15/34; F16J 15/447; F16J 15/54

[52] U.S. Cl. ........................................ 277/9; 277/53; 277/56; 277/81 R; 277/95; 277/152; 277/164; 277/201; 384/480; 384/481; 384/482; 384/484; 384/486; 384/583; 384/585

[58] Field of Search ............... 277/53, 75, 9, 95, 101, 277/152, 146, 181, 182, 189, 201, 186, 214, 166, 165, 164, 54–57; 384/130, 138, 139, 144, 147, 148, 477, 480, 481, 482, 486, 485, 484, 94, 607, 583, 584, 585; 49/494

[56] References Cited

U.S. PATENT DOCUMENTS

| | | | |
|---|---|---|---|
| 2,231,947 | 2/1941 | Rich | 277/95 X |
| 2,392,807 | 1/1946 | Camp | 384/139 |
| 2,547,185 | 4/1951 | Von Bolhar | 277/95 |
| 2,882,081 | 4/1959 | Tobias | 277/95 |
| 3,259,442 | 7/1966 | Boghosian | 384/480 |
| 3,400,954 | 9/1968 | Brown | 277/166 X |
| 3,504,917 | 4/1970 | Malmstrom | 277/95 X |
| 3,511,511 | 5/1970 | Voitik | 277/95 X |
| 3,685,838 | 8/1972 | Malmstrom | 277/75 X |
| 3,960,381 | 6/1976 | Piotrowski | 277/95 X |
| 4,575,265 | 3/1986 | Tooley . | |
| 4,643,439 | 2/1987 | Lewis et al. | 277/95 |

OTHER PUBLICATIONS

Forsheda V-Ring Catalogue by Merkel Forsheda Corporation of Cleveland, Ohio 44139 (pp. 1–31).
Advertisement for Forsheda V-Ring Arrangement in Chicago Rawhide Catalogue (p. 7), date unknown.
Dodge Mounted Bearings Catalogue, 1984 by Reliance Electric Co., pp. B3–6; B3–7; B4–16; B4–17; B4–22; B4–37.

Primary Examiner—Allan N. Shoap
Attorney, Agent, or Firm—Dority & Manning

[57] ABSTRACT

An auxiliary sealing system generally includes a flexible sealing ring, with an optional restraining element, such as a metal band, secured therearound for further fastening same to a given circular member. Such circular member may comprise an extension of the inner race of a bearing assembly secured to a shaft by a plurality of set screw arrangements radially disposed about such inner race extension. The auxiliary seal may be provided with radial holes in the circumference thereof for selectively alignment with such set screws to provide access thereto. After the set screws are tightened, the auxiliary seal may be rotated and clamped to the given circular member to thereby protect the set screws from contamination. An auxiliary sealing system is further provided with a predetermined type of sealing face on at least one surface thereof, which type may be selected in accordance with the intended application of the system, particularly when used in combination with a bearing assembly having a primary sealing means.

5 Claims, 5 Drawing Sheets

SEALING APPARATUS

BACKGROUND OF THE INVENTION

This invention concerns sealing in general, and in particular auxiliary sealing systems and uses of same with a given circular member, such as a bearing assembly received on a shaft. This invention also concerns the combination of a sealing system and a bearing assembly.

In general, it is known to secure pillow block type bearing assemblies to a shaft by having metal collars with hex-socket set screws disposed thereabout received on and secured to the inner ring (i.e. inner race) of the bearing assembly. One such collar is disposed on each axial side of the housing to cooperatively lock the bearing assembly. U.S. Pat. No. 4,575,265 to Tooley, entitled "Seal for Shaft Bearings", and assigned to the present assignee, is one example of such paired collars. FIG. 1 of Tooley is presented and discussed herewith as application FIG. 1.

Generally, it is known to use primary sealing means typically disposed axially inward of set screws for sealing axially inward parts of an inner race with respect to the outer race, as well as with respect to a bearing assembly housing itself. Fluid and/or solid contamination may penetrate both the set screw arrangement and the bearing assembly interior, thereby leading to premature bearing failure and causing difficulty during removal of the bearing assembly.

Special auxiliary seals may be provided, typically disposed on the shaft itself, to completely seal the outer axial ends of the bearing assembly. Such special auxiliary seals are frequently expensive and may require modification to the mounted bearing housing for their use. They also add to the minimum axial length of shaft necessary for mounting such bearing assembly.

The Merket-Forsheda Corp. of Cleveland, Ohio manufactures a so-called V-ring seal which may be received on a shaft to seal the axial end of an assembly associated with the shaft. As noted above, any additional sealing rings added to the shaft require additional shaft length, and the bearing assembly may have to be modified to provide a proper seal surface for the V-ring. Also, if the sealing arrangement is received directly on the shaft outside any protection of the bearing assembly housing, failure of such sealing arrangement may damage the shaft as well as the bearing.

Further, V-ring seals disposed on a shaft and axially outside all portions of a bearing assembly housing cannot seal any set screw arrangements which might be used in combination with the inner race to secure the bearing assembly to the shaft.

It is an additional drawback if an existing secured relationship between a bearing assembly and the shaft to which it is secured has to be disturbed to accommodate changings of seals. Such separation of assembly and shaft could be required if a given seal were an integral unit which had to be slipped on and off over the end of the shaft.

A further disadvantage of auxiliary seals, intended to be received directly on a shaft for axially sealing an assembly received on the shaft, is that a sufficient variety of seals must be maintained by a manufacturer or a user to fit the number of various shaft sizes.

The Forsheda Corporation manufactures another product having a sealing face conventionally known as a labyrinth seal. Either of the Forsheda V-ring or the labyrinth seal may optionally be secured to a given circular member through use of a clamping band, e.g. the Forsheda V-ring Model CT.

In addition to providing sealing rings to be directly received on a rotating shaft, Forsheda also manufactures V-rings to be used as a supplement or in a stacked array, removed from direct contact with the surface of the shaft, but requiring special sleeves or clamping bands for such arrangements.

The present assignee also utilizes sealing rings which are directly received on a shaft or a part of the assembly for axially sealing a bearing assembly housing. Such seals may include labyrinth and V-ring type seals, used both individually and in combination. Such arrangements may require additional shaft length and protrude outside the bearing housing, as discussed above. Also, since certain of such seals are received directly on the shaft, they still involve risk of damage to the shaft itself if the seal fails, which would entail greater expense than just replacing a bearing assembly alone.

SUMMARY OF THE INVENTION

The present invention concerns a sealing construction which recognizes and addresses the concerns noted above, as well as others. While having numerous possible embodiments, one preferred construction in accordance with this invention is particularly adapted for use as an auxiliary sealing system for bearing assemblies which are secured to a shaft by a plurality of set screws disposed about the circumference of an axial extension of the inner race of the bearing assembly. Such bearing assemblies generally have a primary sealing means disposed between the inner race and the bearing housing for providing a radial seal therebetween and an axial seal between the inner and outer race. The bearings themselves are axially captured by such primary sealing means.

Generally, an auxiliary sealing system including features of this invention is disposed axially outward from a primary sealing means, and projects both radially and axially over the extended inner race for protection of the set screws. Such system includes a sealing ring element provided with radial openings disposed about the circumference of such ring element for selective registry with the plurality of set screws of the inner race extension. The ring element may be selectively rotated to alternately provide access to and protection of the set screws. The number of sealing ring element radial openings may vary, as discussed below.

The sealing ring may further include an annular channel radially thereabout which is adapted to receive (as a later-added element or as integrally embedded therein) a sealing band which may be selectively tightened to secure the sealing ring to a circular member, such as a bearing assembly inner race extension. The sealing band may also have radial openings in registry with those of the sealing ring. The band may be selectively rotated with the ring relative a circular member, or later added thereto.

The present invention concerns both such auxiliary sealing system, and the combination of same with a bearing assembly. Generally in accordance with the present method, such a sealing ring may be received about an inner race extension of the type discussed, supra, with its circumferential openings in registry with the plurality of set screws of the inner race extension to provide access thereto. Once the bearing assembly is positioned as desired on a given shaft, the set screws may be tightened to secure such position (or loosened for removal). Thereafter, the auxiliary sealing system (including a flexible sealing ring alone or a flexible sealing ring with some securing means therefor) may be rotated relative the given circular member, e.g. inner race, until the set screws are completely covered. As desired, the securing means (e.g. metal band about the sealing ring) may then be actuated to secure the auxiliary sealing system in place. Further aspects of the present invention are discussed in greater detail below.

Of course, the sealing ring may be subsequently removed or reverse rotated to again provide access to the set screws, which are maintained freely actuable since they are protected by the sealing ring from cotamination.

Since the present sealing ring can be radially disposed about a given portion of an existing inner race extension, it is not necessary to modify the bearing or its housing in order to accommodate such auxiliary sealing system. Also, the auxiliary sealing system does not require additional shaft length for its use because it can be axially confined within the existing inner race extensions of the bearing assembly. Thus, any failure will not cause direct damage to the shaft. As typically mounted, apparatus of this invention also rotates with the shaft and inner race to provide centrifugal forces which protect the bearing assembly by directing both fluid and solid contamination therefrom.

As a further feature of this invention the seal may be readily split to allow replacement thereof without disturbing the coupling between the bearing assembly and the shaft.

The present sealing ring may be provided with a predetermined type (i.e., shape) of sealing face on at least one surface thereof. In one preferred embodiment, such surface is turned axially inwards towards a primary sealing means of the bearing assembly housing in a sealing arrangement therewith.

The type of sealing face and type of seal (clearance groove or contact) may be selected based on the intended application of the circular member.

Numerous variations and modifications to the present invention will be readily apparent to those of equivalents, and the like are intended to be included within the scope of this invention by virtue of present reference thereto. Furthermore, various collections of features of the present invention may be provided as a given embodiment in accordance with this invention. For the present purposes of this disclosure, several specific exemplary embodiments of the apparatus are disclosed.

One exemplary embodiment in accordance with features of the present invention includes an auxiliary sealing apparatus for a bearing assembly received about a rotatable shaft and including a circular member having means for securing the assembly to the shaft comprising a ring element receivable about the circular member, the ring element defining at least one radial opening therein; and face sealing means of a predetermined configuration secured to the ring element around the circumference of same and extending outwardly therefrom, the sealing means being mateable with a portion of the bearing assembly so that the ring element opening may be moved into registry with the securement means for access thereto and moved out of registry therewith for sealing same while the face sealing means cooperates with the position of the bearing assembly to define a seal thereto.

Another more detailed construction in accordance with the present invention concerns a bearing assembly comprising: a housing enclosing an outer race, roller bearings enclosed within the outer race, and an inner race radially enclosed within the roller bearings and receivable on a rotatable shaft, and having a plurality of set screws disposed in an axial extension of the inner race for selectively securing the assembly to such shaft; a sealing ring received about the inner race axial extension for rotation therewith, and for sealing a space defined between the inner race extension and the housing of the bearing assembly; and at least one radial opening formed in the circumference of the sealing ring for selective alignment with the set screws of the inner race extension; wherein the sealing ring may be selectively rotated between one group of positions such that the radial opening is consecutively brought into registry with the set screws to provide access thereto, and another position such that the opening is out of registry with the set screws whereby said sealing ring covers and protects same.

BRIEF DESCRIPTION OF THE DRAWINGS

A complete understanding of the foregoing, as well as further features and advantages of the present invention will become apparent from the following detailed, enabling description thereof, taken in conjunction with the appended figures, in which.

Figure 1:
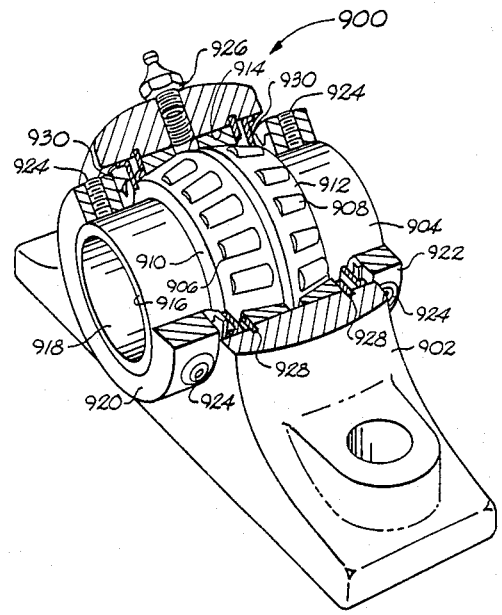
FIG. 1 is a perspective view of a known pillow block bearing arrangement for supporting a circular member such as a shaft, with a portion of the bearing housing broken away to better illustrate primary seals therein.

Use of like reference characters throughout this specification and the drawings is intended to refer to same or analogous elements or features of the present invention. The following specification is directed to several specific exemplary, preferred embodiments of this invention, including the best mode thereof, for purposes of description and illustration only and not for purposes of limitation.

DETAILED DESCRIPTION OF THE PREFERRED EMBODIMENTS

FIG. 1 is an illustration of FIG. 1 of U.S. Pat. No. 4,575,265 by Tooley, and shows a pillow block bearing assembly partially cut away to show primary sealing means thereof. The description of FIG. 1 included in such U.S. Patent is herein incorporated by reference. In general, pillow block 900 has a housing 902 which generally encloses a bearing assembly 904. Two rows of roller bearings 906 and 908 are captured by cages 910 and 912, respectively. Outer race 914 and inner race 916 are also captured within housing 902.

Typically, a circular member such as a shaft is inserted through bearing assembly 904, particularly through opening 918 thereof. Once a shaft or like element is so received, a pair of collars 920 and 922 are secured about axially outward portions of inner race 916 with a plurality of set screws 924. A lubricating fixtures 926 permits the introduction of lubricant into housing 902. Furthermore, snap rings 928 maintain proper alignment of bearing assembly 904 within housing 902, while primary seals 930 are also received so as to form a seal between outer race 914 and inner race 916 in a known manner. Further, such seals axially capture the pair of rows of roller bearings in cages therefor, and in general permit purging action of lubricant therefrom in a known manner.

While the structure of the Tooley invention is quite good, the present invention represents an improved structure. For example, the present invention permits the collar 920, 92 to be eliminated, with set screws provided through the extension of the inner race at opposite ends of the bearing assembly. In such instance, the auxiliary sealing system of the present invention may be used to shield the set screws against possible contamination and provide auxiliary sealing for the assembly.

Figure 2A:
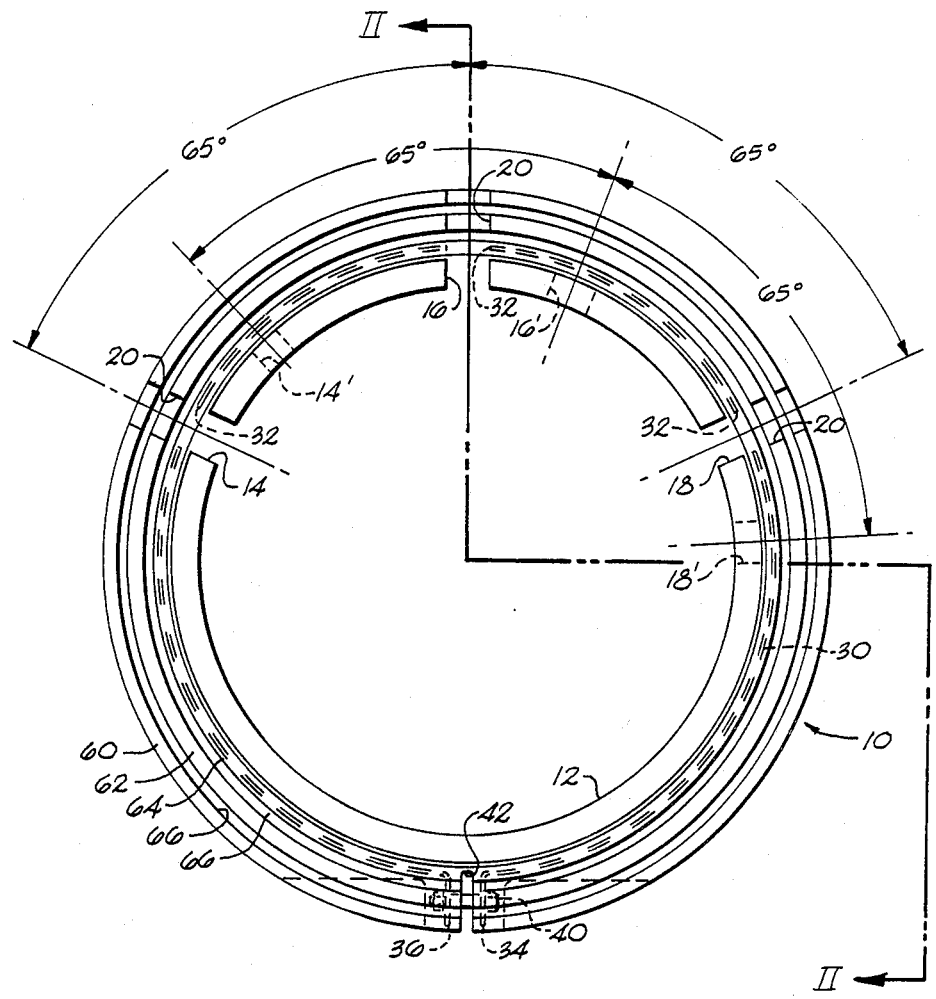
FIG. 2A is a side cross-sectional view of one exemplary embodiment of an auxiliary sealing system in accordance with features of the present invention, including illustration of same received on a cross-sectional view of an inner race of a bearing assembly as an exemplary circular member.

FIG. 2A illustrates a cross-sectional view of a sealing ring 10 received about a member 12, such as an axial extension of an inner race for a bearing assembly. Inner race extension 12 is provided with a plurality of openings 14, 16, and 18 about the circumference thereof for receipt of set screws (not shown for clarity) which engage a shaft about which the bearing assembly is received. Such set screws lock inner race extension 12 and hence its associated bearing assembly onto the shaft for rotation therewith.

Set screw openings 14, 16, and 18 may be disposed about inner race extension 12 at predetermined angular intervals, such as 65°. Sealing ring 10 may be provided with one or more openings or holes 20 about its circumference for selected registry with the inner race set screw openings 14, 16, and 18. When so aligned, openings 20 provide access to the inner race set screws so that they may be selectively tightened or loosened to secure or remove, respectively, the bearing assembly with respect to a shaft. In accordance with alternative features of the present invention, discussed in greater detail below, sealing ring 10 may be disposed about inner race extension 12 either before or after the bearing assembly is placed about a shaft.

After tightening the inner race set screws, sealing ring 10 may then be rotated relative inner race 12 so as to completely cover and protect the set screw arrangements from the environment. Dotted line representations 14′, 16′, and 18′ illustrate one example of the relative positions of such screw openings after sealing ring 10 of this invention is rotated about usually fixed inner race extension 12.

Where a separate, corresponding opening 20 is provided for each set screw arrangement (as illustrated in present FIG. 2A), comparatively little relative rotation between ring 10 and inner race extension 12 is needed (e.g. 5°–10°) to selectively provide access to all the set screws and then cover same.

Alternatively, if fewer openings 20 are provided than the number of set screw arrangements, then the rotation of ring 10 relative race extension 12 obviously must be greater. Ring 10 may for example include only a single opening 20. In such arrangement, ring 10 would be rotated in stages until access is provided to all set screws for the intended manipulation.

Figures 2B, 3, 4:
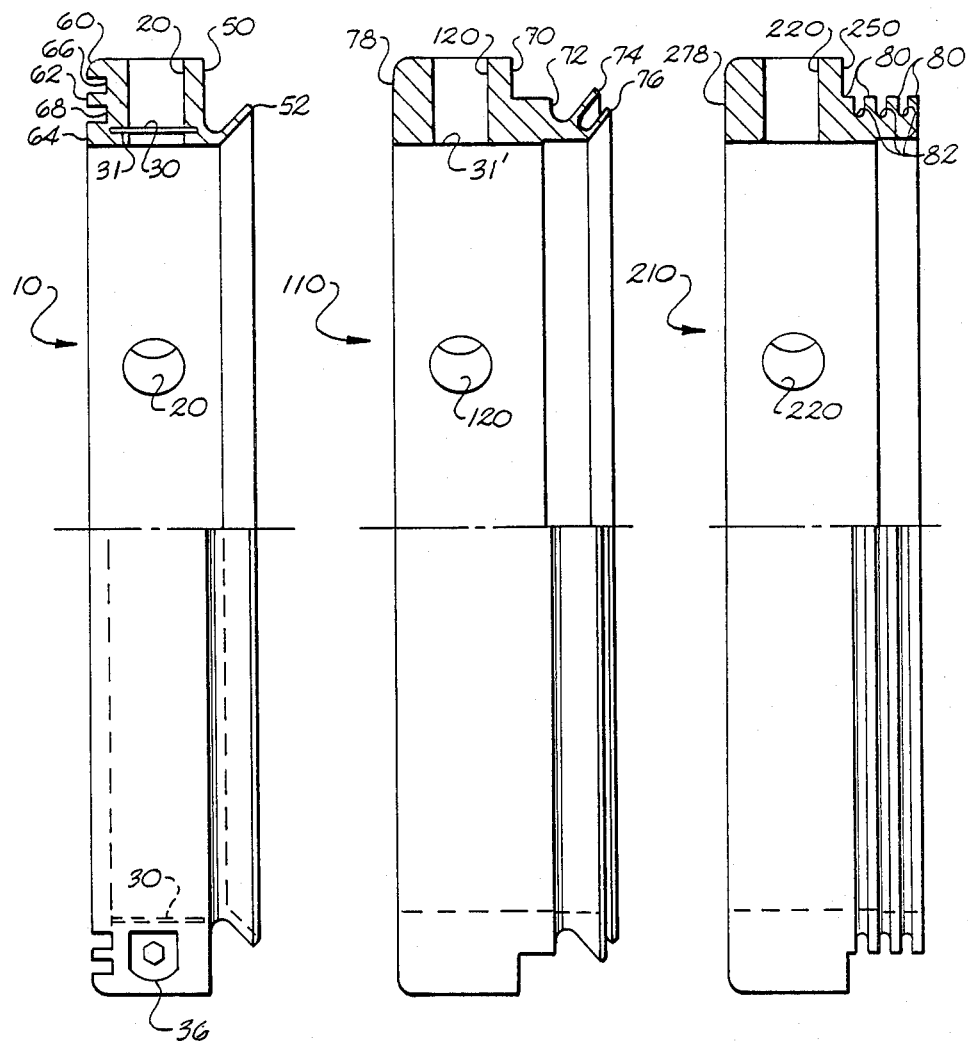
FIG. 2B is a partial sectional side view of the FIG. 2A embodiment taken along line II—II indicated therein.
FIGS. 3-6 are views (analogous to the sectional illustration of FIG. 2B) of alternative embodiments of an auxiliary sealing system in accordance with the present invention, each illustrating particular alternate sealing faces thereof, as well as other features of this invention.

Referring to both FIGS. 2A and 2B, a sealing band 30 is embedded in an annular channel 31 in sealing ring 10. It is preferred but not required that such band have a thin metal construction. Band 30 is a generally circular element having one or more radial openings 32 about its circumference for registry with radial openings 20 of sealing ring 10. Further, band 30 has two end tabs 34 and 36 which receive a screw and nut arrangement 40 (shown in dotted line in FIG. 2A) for tightening and loosening same and through ring 10 about inner race extension 12. While screw and nut arrangement 40 are preferred, alternatives thereto may be practiced.

During installation, after the set screws have been desirably tightened and sealing ring 10 has been rotated to cover the set screws, nut and bolt arrangement 40 may be tightened to secure sealing ring 10 in place about inner race extension 12. Sealing band 30 may be embedded in sealing ring 10 as illustrated in FIG. 2, or it may be separate therefrom. In instances where sealing ring 10 by itself fits sufficiently tight about a circular member to perform its sealing function, sealing band 30 may be omitted altogether.

As illustrated in FIG. 2A, sealing ring 10 may be provided with a relatively small area or section 42 having a reduced thickness, adjacent end tabs 34, 36 of band 30 for example permitting ring 10 to be severed for ease of removal. For example, if a ring 10 were damaged or if the use of a given shaft and bearing assembly were to be changed, an auxiliary sealing system of the present invention could be replaced or substituted for an alternative embodiment with a different type of sealing face, without disturbing the existing securement between the bearing assembly and the shaft. Severance of ring 10 could be made at the relatively small section 42, and the nut and bolt arrangement 40 could be removed to permit release of band 30. After such removal, a new sealing ring and/or sealing band could be added with an alignment which covers and protects the inner race set screws.

The exemplary embodiment of FIGS. 2A and 2B is provided with two different types of sealing faces on one sealing ring, one each on two opposing surfaces of sealing ring 10. Such an embodiment may be rotated (i.e. reversed) as desired so as to select which of its sealing faces is provided in a particular disposition. For example, lip seal features 50 and 52 may be disposed (in either a clearance or a contact sealing configuration) just axially outward from a primary sealing means (generally such as 930 of FIG. 1 above, or 706/806 of FIGS. 7 and 8 below). Other exemplary embodiments of this invention may have a sealing face on only one surface thereof, or even may have no sealing face at all, instead providing radially-inward sealing only (e.g. sealing for inner race set screw arrangements).

The lip seal arrangement of FIGS. 2A and 2B is defined by the V-ring configuration including a solid surface 50 and single angular projection 52, disposed in this example at approximately a 45° angle generally from surface 50. An opposing surface of ring 10 forms a different predetermined type of sealing face known as a labyrinth configuration (discussed below with reference to FIG. 8). Projections 60, 62, and 64 define a common plane relative recesses 66 and 68. In this embodiment, annular channel 31 for receiving restraining member (band) 30 is disposed adjacent projection 64, but alternative equivalent configurations may be practices as desired or as needed for particular circumstances.

FIGS. 3–6 illustrate various alternative exemplary embodiments of the present invention, particularly illustrating varying types and configurations of sealing rings, including sealing faces thereof. Each such figure illustrates a cross-sectional view analogous to that of FIG. 2B. Detailed description is not repeated for features thereof adequately described with reference to earlier figures.

FIG. 3 illustrates a lip seal configuration having two generally parallel surfaces 70 and 72 on one side thereof, with two angular projections 74 and 76 cooperating therewith at approximately a 40° angle to define a double V-ring configuration. An exemplary application of such arrangement is shown generally in FIG. 7, discussed below. In general, ring 110 has radial openings 120, analogous to prior embodiments. A generally planar surface 78 replaces labyrinth elements 60–68 of the FIGS. 2A and 2B embodiment. If axial surface 78 is appropriately sized, the FIG. 3 embodiment could also be reversed to alternately provide a contact type sealing face with surface 78 for operative association with a given primary sealing means or the like.

No particular annular channel 31 is illustrated for receipt of a sealing band 30, but such a band could be added either before or after sealing ring 110 is positioned about a circular member. Of course, a channel 31 similar to that shown in FIG. 2 or one providing for an embedded band but axially confined to the widths of openings 120 (as represented by channel 31'), could be used interchangeably with this or any other embodiment of this invention.

The exemplary embodiment of FIG. 4 (similar to the FIG. 3 embodiment) also provides a relatively flat or planar surface 278 in place of labyrinth elements 60–68 of the FIG. 2 embodiment, and includes a modified labyrinth configuration on the opposite side thereof, in lieu of the double V-ring arrangement of FIG. 3. Projections 80 and associated recesses 82 define a labyrinth configuration type sealing face extending in an axial direction. Recesses 82 will cooperate with corresponding projections from other elements of a bearing assembly in a so-called labyrinth piston ring seal, as discussed below with reference to FIG. 8. Ring surface 250 also cooperates with the housing of the bearing assembly, as discussed with reference to FIG. 8. Ring 210 also includes radial openings 220, analogous to prior embodiments.

Figures 5, 6:
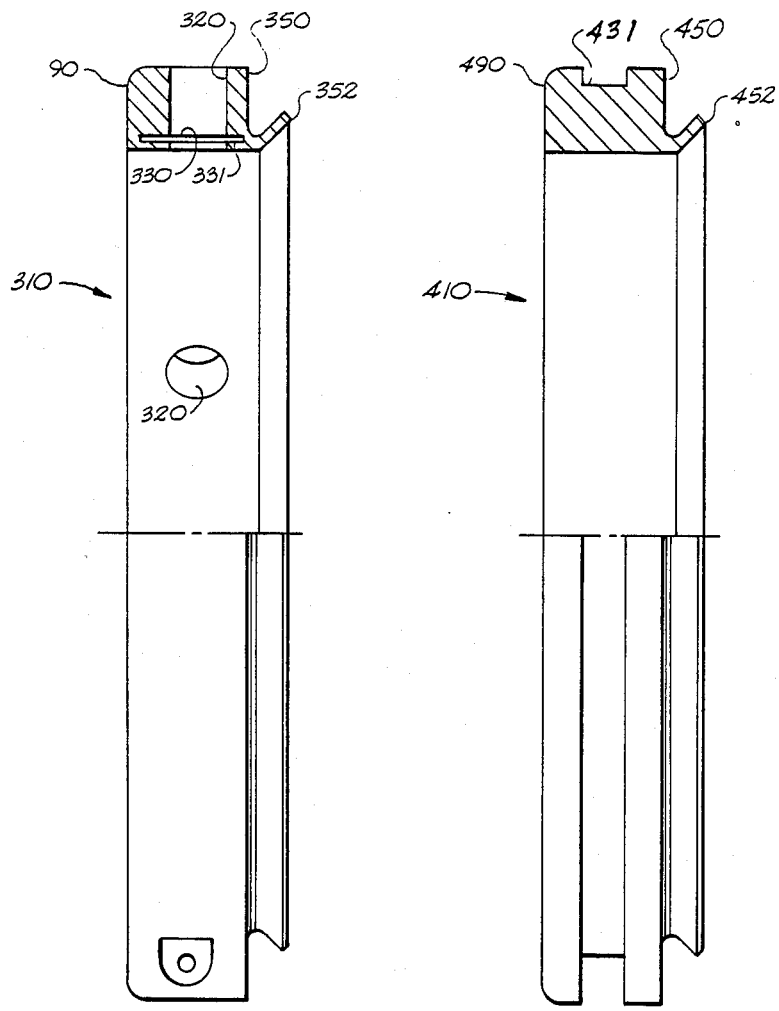

FIG. 5 illustrates an embodiment similar to that of the FIG. 2 embodiment, but with labyrinth elements 60–68 replaces with single surface 90. A thin annular channel 331 similar to that of FIG. 2 for use with a sealing band 330 is also illustrated, but a channel 31' similar to that of FIG. 3 could be used instead. Further, it is possible that a specific channel could be omitted entirely, and a restraining member applied to the periphery of sealing ring 310. If sealing ring 310 is provided with sufficiently tight tolerance, a restraining member or band could be completely omitted, but such configuration is not preferred since it may make it more difficult than desired to relatively rotate the sealing ring, in accordance with other features of the present invention, for selected alignment of openings 320.

While radial openings 320 may be provided in sealing ring 310, with a cooperative, mated opening in a restraining member 330 (not shown), this invention is not limited to such openings or a particular number of such openings, as discussed above with reference to FIG. 1. In fact, an auxiliary sealing system generally in accordance with the present invention may be provided with a sealing ring 410 without any specific radial openings about its circumference, as illustrated in FIG. 6. In such instance, sealing ring 410 may be moved in an axial direction relative the set screw arrangement (instead of being rotated relative same) in order to selectively cover and uncover same. The exemplary embodiment of FIG. 6 is a further example of a lip seal V-ring configuration 450 and 452 similar to FIGS. 2 and 5, and is also provided with an annular channel 431 adapted for receiving an attachment means (i.e. restraining member or band) therein. Generally, flat ring surface 490 opposes V-ring configuration 450 and 452 to provide an alternate flat seal configuration.

Figure 7:
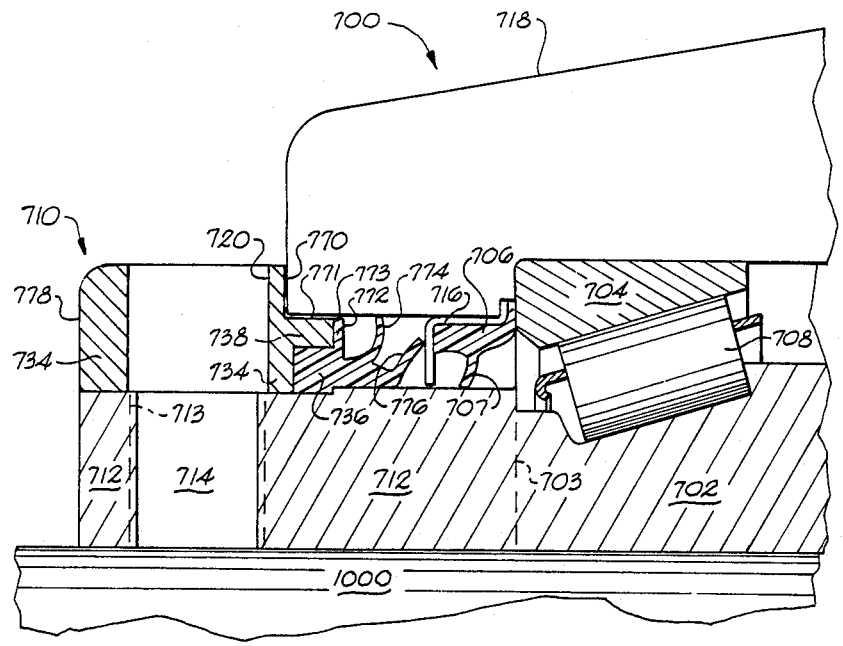
FIGS. 7 and 8 are fragmentary cross-sections of auxiliary sealing systems in accordance with the present invention having lip-seal and labyrinth sealing faces, respectively, illustrated in conjunction with fragmentary views of an exemplary bearing assembly received about a shaft.
Figure 8:
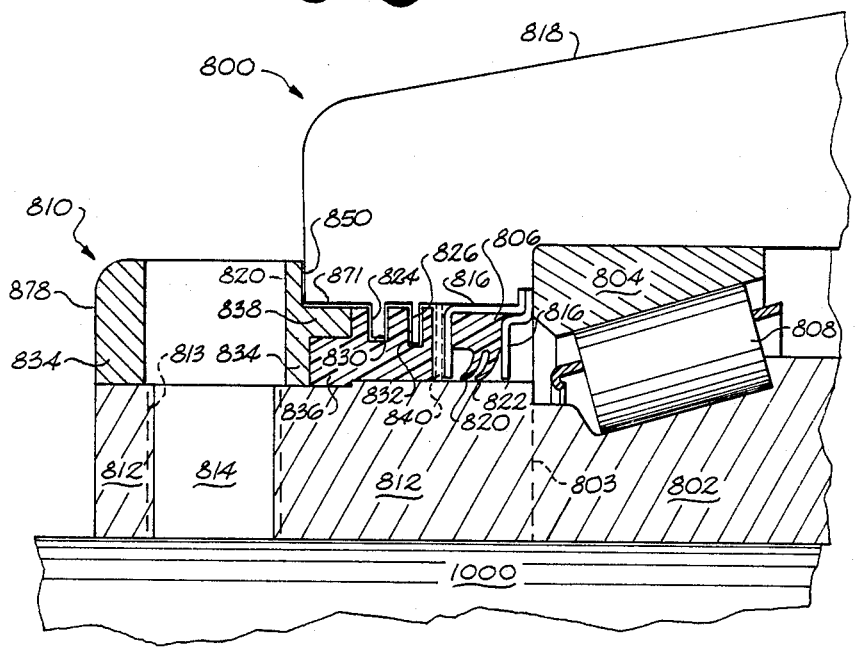

Referring now to FIGS. 7 and 8, respectively concerning a lip seal type arrangement and a labyrinth type arrangement, a fragmentary section of a bearing assembly 700 and 800, respectively, is illustrated as received on a rotatable shaft 1000. Bearing assembly 700/800 is generally similar to the assembly shown in more detail in present FIG. 1, but without axial collars, and with set screws disposed directly into the inner race axial extension.

Bearing assembly 700/800 includes inner race 702/802, outer race 704/804, primary sealing means 706/806, and roller bearings 708/808, which are generally known and understood by one of ordinary skill in the art without further explanation required. Dotted line 703/803 illustrates the axially-outward bounds of outer race 704/804. Inner race 702/802 extends axially outwardly to define an extension 712/812 having a plurality of openings 713/813 for receipt of set screws 714/814 therein to secure assembly 700/800 to a shaft 1000 (only one illustrated for each embodiment). Set screws 714/814 are received within openings 713/813 defined by inner race extension 712/812, similar to openings 14, 16, and 18, of present FIG. 2A.

Primary sealing means 706/806 may be operatively associated with sealing spacer elements 716/816 for providing a radial seal between inner race 702/802 (including its extension) and outer housing 718/818 of bearing assembly 700/800. Primary sealing means 706/806 also seals between inner race extension 712/812 and outer race 704/804, while also being disposed axially outward from roller bearings 708/808. The illustrations of FIGS. 7 and 8, of course, only show one axial end of their respective bearing assemblies, the other end of which also has an axially extended inner race, an outer race, a primary sealing means, and the like.

Axially outward from primary sealing means 706/806 is disposed an auxiliary sealing system in accordance with features of the present invention. Referring to FIG. 7, a double V-ring attachment similar to application FIG. 3 is illustrated. Sealing ring 710 typically comprises flexible, elastomeric material made of neoprene or the like. Ring 710 may have a plurality of openings 720 (only one illustrated) for selected registry with openings 713 to provide access to set screws 714. Ring 710 covers and protects set screws 714 whenever openings 720 are rotatably displaced therefrom.

Because of its flexibility, angular projection 774 (normally straight in its un-load condition, as illustrated in present FIG. 3) is compressed into a wiping seal (i.e. curved finger position) as illustrated in FIG. 7 whenever sealing ring 710 is fitted radially between inner race extension 712 and housing 718. Such arrangement provides a lip-seal for the surface of housing 718, while permitting angular projection 776 to provide a lip-seal with spacer element 716 and primary sealing means 706.

The relationship of projections 774 and 776 with bearing assembly 700 permits the bearing assembly to be purged by the known outward flow of lubricant, yet be protected from the ingress of foreign matter. For example, a gap 773 is defined between projection 772 and housing 718 to permit lubricant to enter a channel 771. Channel 771, defined between sealing ring 710 and housing 718 and connecting parallel axial surfaces 770 and 772, promotes such purging, while the resistance to curvature of projections 774 and 776 rejects the ingress of contaminants. Flexed projection 707 of primary sealing means 705 functions in a similar purging/rejecting manner, in combination with the slight gap typically existing between inner race extension 712 and the edge of sealing spacer 716 which faces same.

Referring to FIG. 8, primary sealing means 806 includes two flexed projections 820 and 822 for permitting purging of the bearing assembly by the outward flow of lubricant, while also protecting assembly from the ingress of foreign matter. Housing 818 is of a type intended for use with a labyrinth piston ring seal, and is provided with projections 824 and 826 projecting inwardly from housing 818 which are intended to generally mate with recesses 830 and 832 of sealing ring 810. The projecting fingers on both sides of recesses 830 and 832 are sufficiently flexible to permit removal of sealing ring 810 from between inner race extension 812 and housing 818 without requiring removal of bearing assembly 800 from shaft 1000. Of course, ring 810 may be provided with a reduced cross-sectional such as area 42 of FIG. 2A (not shown) for further ease of its removal.

Sealing ring 810 of FIG. 8 is generally similar to ring 210 of FIG. 4, but has fewer recess/projection pairs. Ring 810 includes surface 850 in parallel with the axially outward surface of housing 818, but with a slight gap therebetween to permit purging. Axially outward surface 878 of sealing ring 810 does not extend axially beyond inner race extension 812, but instead is illustrated as flush therewith. Hence, use of sealing ring 810 requires no additional shaft length. Radial opening (or openings) 820 may be selectively aligned with set screw arrangements 814 of inner race extension 812, to accoplish the purposes and functions relative thereto discussed above.

Also, for the sake of clarity, no particular embodiments of a restraining member are shown in either FIGS. 7 or 8, although such could of course be employed. Also, a portion of ring 710/810, such as cross-hatched areas 734/834, could be comprises of metal to correspond to a sealing band feature, with the remaining shaded regions 736/836 corresponding to the sealing ring feature. In such instance, projections 738/838 in an axial direction of such sealing band feature would retain and draw in the sealing ring portion.

The present invention may be practiced as a clearance groove type seal or a face contact type seal. The solid line representations of FIG. 8 illustrate a clearance groove type seal by virtue of the axial distance between sealing ring 810 and sealing spacer elements 816. If a face contact type seal arrangement were desired, various alternatives could be undertaken, such as the addition of a spacer element 840 (illustrated in dotted line in FIG. 8) axially disposed between sealing ring 810 and sealing spacer element 816.

As illustrated by FIGS. 7 and 8, bearing assemblies themselves include alternative types. For example, housing member 818 may include labyrinth piston projections 824 and 826 of FIG. 8, or may instead provide a smooth surface as in FIG. 7. Various constructions and methods in accordancd with features of the present invention may provide an auxiliary sealing system for each such bearing assembly without requiring any modification to the bearing assembly or its housing, and without departing from the spirit and scope of this invention. Also, the different types of sealing faces disclosed herein may be used with different intended application. For example, a lip type seal (e.g., a single or double V-ring arrangement) may be used in contact type sealing arrangement for applications where slow to moderate rotary speed with heavy fluid or solid contamination is expected. A labyrinth-type seal and/or a clearance-type seal may be utilized for higher speed applications. Face contact seals may be used for slow speed, severe contamination applications.

Furthermore, an auxiliary sealing system in accordance with this invention is adaptable for use with bearings attached to a shaft by methods other than the assemblies illustrated in present FIGS. 7 and 8, such as locknuts and various adapters. Variations and modifications of such nature which would occur of one of ordinary skill in the art, either applying the features of the present invention to a particular bearing housing or to an altogether new shaft arrangement, are all included features of this invention. In each instance, the present auxiliary sealing system generally relates to an add-on device, therefore rendering same readily adaptable for different environments, including an axial extension of an inner race of a bearing assembly, various locknut and adapter related versions thereof, or even direct attachment to a shaft where all sealing features of the bearing assembly are preserved within its housing.

A plurality of embodiments in accordance with this invention (for example, directed to different radius sizes and types of sealing faces) may be stocked by a distributor or a user for selected association with an integral or primary seal. The particular type of auxiliary sealing system may be selected on sight by the user as an add-on feature for a given application. The present invention is particularly adapted for such role because a given inner race outer diameter may cover a family of bearing assemblies with various inner race inner diameters suitable for mounting on different size shafts. Hence, providing auxiliary sealing systems intended to fit the outer diameter of an inner race instead of the shaft requires less inventory to cover all possible applications.

It is a further advantageous feature of the present invention that the auxiliary sealing system extends the life of a primary sealing means when in lip contact with same by protecting the inner race surface from corrosion at their point of contact. Hence, present features are particularly advantageous when used in a construction which provides an auxiliary sealing system axially outward from a primary sealing means. Of course, a given construction in accordance with this invention need not be limited to inclusion of such feature.

Another alternative aspect of this invention could involve application of the present features to a metal collar, where the clamping action of a collar is still required. In such instance, the inner ring (i.e. inner race)

of a bearing assembly might be split and retained by a split or solid collar, with a construction in accordance with features of the present invention providing a sealing function between such collar and the remainder of the bearing assembly structure.

Any of the various constructions which provide an auxiliary sealing system in accordance with features of the present invention will permit the bearing assembly to be lubricated by the normal purging action of grease during relubrication of the bearing. In addition to providing required lubricating functions, such grease purging action will fill any voids in the auxiliary sealing system and as combined with a bearing assembly (having primary sealing means), which aids the sealing function thereof while flushing out contamination which may try to enter the bearing assembly.

All variations and modifications, including equivalents of various features, elements, and steps which may occur to one of ordinary skill in the art are intended to be included within the present teachings. Furthermore, while several preferred exemplary embodiments of the present invention have been discussed in detail, all such discussion constitutes words of description, rather than words of limitation, which appear only in the following claims.

What is claimed:

1. A sealing apparatus, comprising:
    flexible seal means, generally circular and having respective inside and outside diameters, and defining at least one radial hole in the circumference thereof, and adapted for placement about a circular member for sealing same; and
    restraining means, generally circular and defining at least one radial hole in the circumference thereof, disposed concentrically with said seal means about said circular member for securement of said seal means thereon; wherein
    said seal means and said restraining means being disposed relative one another for registry of their respective holes;
    said seal means includes an interiorly-defined annular groove defined between the inside diameter and outside diameter thereof for receipt of said restraining means;
    said restraining means comprises a ring-like annular, metallic member embedded in said seal means groove therefor;
    said flexible seal means includes two sealing faces of different types on opposing axial surfaces thereof; and
    said flexible seal means is adapted to be reversed for selective orientation of said two different types of sealing faces relative a circular member.

2. A sealing apparatus as in claim 1 wherein at least one of said sealing faces comprises a lip type seal.

3. A sealing apparatus as in claim 1 wherein at least one of said sealing faces comprises a clearance groove type seal.

4. A sealing apparatus as in claim 1 wherein at least one of said sealing faces comprises a labyrinth type seal.

5. A sealing apparatus as in claim 1 wherein at least one of said sealing faces comprises a face contact type seal.

* * * * *